(12) United States Patent
Rankov et al.

(10) Patent No.: US 7,958,089 B2
(45) Date of Patent: *Jun. 7, 2011

(54) PROCESSING OF A GENERALIZED DIRECTED OBJECT GRAPH FOR STORAGE IN A RELATIONAL DATABASE

(75) Inventors: Alex Rankov, Danville, CA (US); Meir Amiel, Pleasanton, CA (US); Oleg Bivol, Toronto (CA)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/653,312

(22) Filed: Dec. 11, 2009

(65) Prior Publication Data

US 2010/0100567 A1    Apr. 22, 2010

Related U.S. Application Data

(63) Continuation of application No. 11/824,375, filed on Jun. 29, 2007, now Pat. No. 7,664,779.

(51) Int. Cl.
*G06F 17/30* (2006.01)

(52) U.S. Cl. ......... 707/620; 707/623; 709/203; 709/219
(58) Field of Classification Search .................. 707/620, 707/623, 999.103, 999.107; 709/203, 219
See application file for complete search history.

(56) References Cited

U.S. PATENT DOCUMENTS

| | | | | |
|---|---|---|---|---|
| 6,735,593 | B1 * | 5/2004 | Williams | 1/1 |
| 7,634,377 | B2 * | 12/2009 | Kasselmann et al. | 702/127 |
| 2008/0005194 | A1 * | 1/2008 | Smolen et al. | 707/202 |

* cited by examiner

*Primary Examiner* — Leslie Wong
(74) *Attorney, Agent, or Firm* — Van Pelt, Yi & James LLP (57) ABSTRACT

Creating transaction instructions is disclosed. A description of a set of objects is received. For each of at least a subset of objects in the set of objects, a description of one or more associated relationships is received. The description of the set of objects and the descriptions of the one or more associated relationships for each object in the at least a subset of the set of objects are processed to create an ordered list of transaction instructions for storing the set of objects and the one or more associated relationships for each object in the at least a subset of the set of objects.

15 Claims, 10 Drawing Sheets

Data Package Sent from Client to Server

Object List
F1
F2
F3
F4
F5
F6
F7

F1 Relationship List
F2: Parent, Folder
F3: Parent, Folder
F4: Child, Folder

F2 Relationship List
F5: Parent, Folder
F4: Parent, Folder
F1: Child, Folder

F3 Relationship List
F4: Parent, Folder
F1: Child, Folder

F4 Relationship List
F1: Parent, Folder
F2: Child, Folder
F3: Child, Folder

F5 Relationship List
F6: Child, Folder
F7: Child, Folder
F2: Child, Folder

F6 Relationship List
F5: Parent, Folder

F7 Relationship List
F5: Parent, Folder

PROCESSING OF A GENERALIZED DIRECTED OBJECT GRAPH FOR STORAGE IN A RELATIONAL DATABASE

CROSS REFERENCE TO OTHER APPLICATIONS

This application is a continuation of U.S. patent application Ser. No. 11/824,375, entitled PROCESSING OF A GENERALIZED DIRECTED OBJECT GRAPH FOR STORAGE IN A RELATIONAL DATABASE filed Jun. 29, 2007, now U.S. Pat. No. 7,664,779 which is incorporated herein by reference for all purposes.

BACKGROUND OF THE INVENTION

A directed object graph includes a number of objects with relationships between the objects that have a direction. For example, a directed object graph of a directory structure includes files and folders where a file or a folder can have a directed relationship 'parent' with the folder in which the file or folder resides. When executing transaction instructions for storing a directed object graph using a relational database, a given transaction instruction may require another transaction instruction be executed prior to it. For example, an instruction to create an object with a 'parent' relationship requires the parent object exist prior to the instruction executing; in other words an instruction to create the parent object needs to have been executed before the instruction to create the child object with a parent relationship to the parent object. So that if the instructions are created in an incorrect order, the relational database may not be able to execute a transaction instruction upon receipt of the instruction.

A simple solution, in a situation where the order of the transaction instruction is being taken from another process, such as transferring the directed object graph between a client and a server, is to configure the transfer process to transfer the objects and relationships in a proper order. Then, the transaction instructions associated with the transferred objects and relationships can be created as the objects and relationships arrive. However, this requires an understanding by the transferring agent of the client of the rules or proper order associated with the relational database of the server. One solution to this is to encode the rules in the transferring agent of the client in the form a custom application. However, this poses problems as processing becomes more distributed and transferring agents must be updated to maintain current understandings of all rules associated with each of potentially a plurality of servers. It would be beneficial to be able to transfer directed object graphs without concern for what order objects and relationships are transferred and efficiently create transaction instructions for storing the directed object graph in a relational database.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Creating transaction instructions is disclosed. A description of a set of objects is received. For each object in the set of objects, a description of one or more associated relationships is received. The descriptions of the set of objects and of the one or more associated relationships are processed to create a list of transaction instructions for storing the set of objects and one or more associated relationships for each object of the set of objects. The list of transaction instructions is ordered in an appropriate order for storing the objects of the set of objects in a relational database. The order of the transaction instructions is such that objects are created in an order such that an instruction to create a first object does not fail because a second object that is required by a relationship to be created prior to the creation of the first object has not yet been created. Transaction instructions are also combined or ordered to efficiently create relationship(s) or update objects with relationship(s).

In some embodiments, instructions to combine object creation and relationship creation are combined if appropriate.

Figure 1:
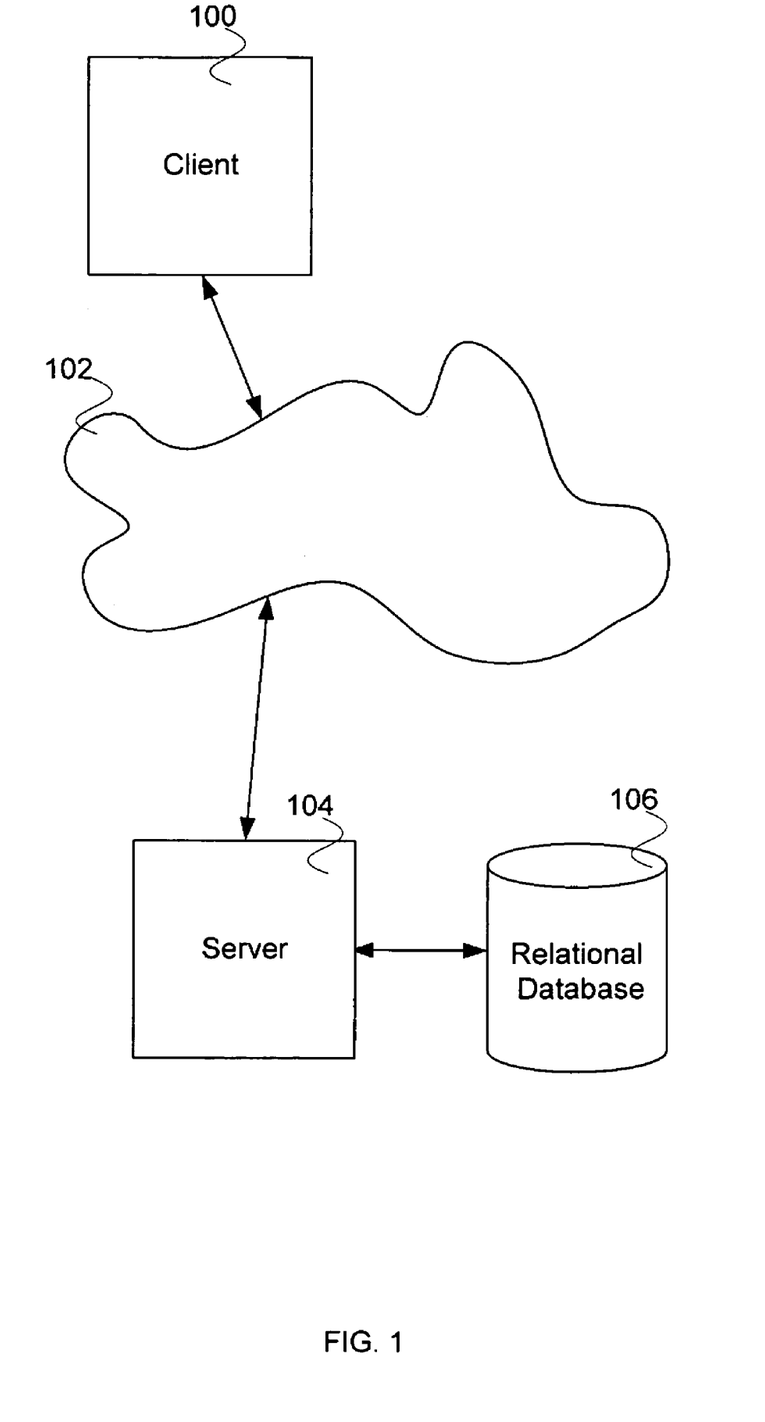
FIG. 1 is a block diagram illustrating an embodiment of a system for processing a generalized directed object graph for storage in a relational database.

FIG. 1 is a block diagram illustrating an embodiment of a system for processing a generalized directed object graph for storage in a relational database. In the example shown, server 104 receives from client 100 via network 102 a generalized directed object graph for storage in a relational database. The generalized directed object graph includes a set of objects and, for each object in the set of objects, a list of associated relationships for each object. The set of objects can be described in any order, can be a complete listing, can be a partial listing (e.g., where one or more of the objects are sent in another communication), can include references to previously stored objects, or any other appropriate list or definition of one or more objects. The associated relationships for each object can include any directed relationship. For example, an email object has relationships with addresses (e.g., source address, destination address) where the relationship between the object email and an object address is 'has source address' or 'has destination address.' For another example, a folder object has relationships with files that are in the folder, where relationships between the files are children of the folder or, in other words, each of the files has a parent—the folder.

In various embodiments, the relationship comprises: 1) a relationship where a second object is required to be created before a first object in the relationship between the first object and the second object (e.g., second object is parent of first object), 2) a relationship where a first object is required to be created before a second object in the relationship between the first object and the second object (e.g., second object is child of first object), 3) a relationship where there is no requirement of which object is created first, or any other appropriate order requirement for a relationship.

In various embodiments, a relationship associated with an object is described separately, together with a number of other relationships for the object (e.g., a partial listing), together with all other relationships for the object (e.g., a complete listing), in any order in a list of relationships for the object, or any other appropriate manner of describing a relationship.

In various embodiments, an object comprises a file, a folder, a document, a set of data, a set of computer code, or any other appropriate content, information, or set of information. In various embodiments, a relationship comprises a parent relationship, a child relationship, a link relationship, a 'belongs to' relationship, an attached relationship, or any other appropriate relationship between two objects.

Client 100 processes user input information and is part of a distributed application architecture, where resources associated with client 100 and server 104 are used in the processing of information for a user. Data can be sent between client 100 and server 104 using network 102. In various embodiments, network 102 comprises a wired network, a wireless network, a local area network, a wide area network, the Internet, or any other appropriate network for communicating data. Server 104 can access data and store data in relational database 106. In some embodiments, server 104 manages content (e.g., retention management, search management, security management, as used in work flows, etc.) using relational database 106 as a content repository.

Figure 2A:
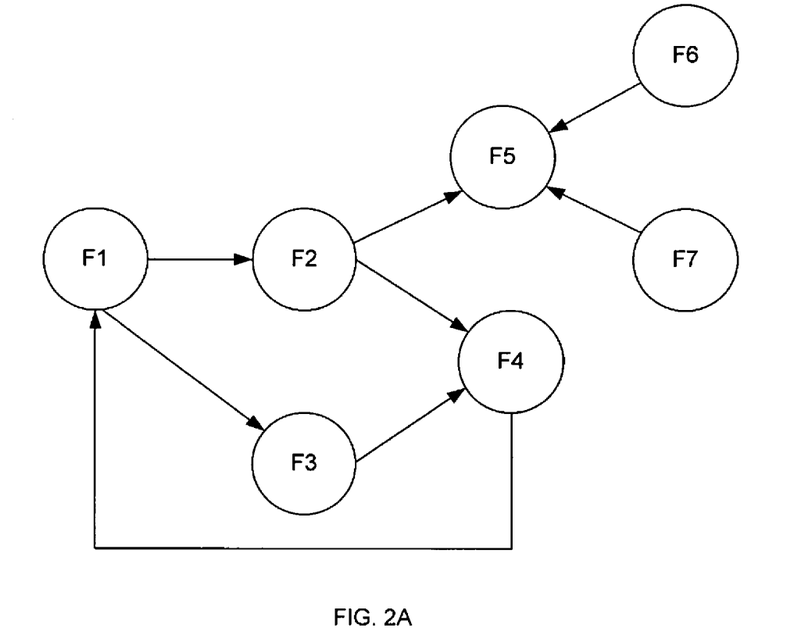
FIG. 2A is a block diagram illustrating an embodiment of a directed object graph.

FIG. 2A is a block diagram illustrating an embodiment of a directed object graph. In the example shown, objects F1, F2, F3, F4, F5, F6, and F7 are shown with a number of relationships. The relationships have a direction as depicted by the arrow. The arrow represents a parent/child-type relationship, where in a relational database the parent is required to exist before a child can be created and linked with the parent. Object F1 has parent F2, parent F3, and child F4. Object F2 has parent F5, parent F4, and child F1. Object F3 has parent F4 and child F1. Object F4 has parent F1, child F2, and child F3. Object F5 has child F2, child F6, and child F7. Object F6 has parent F5. And, object F7 has parent F5.

Figure 2B:
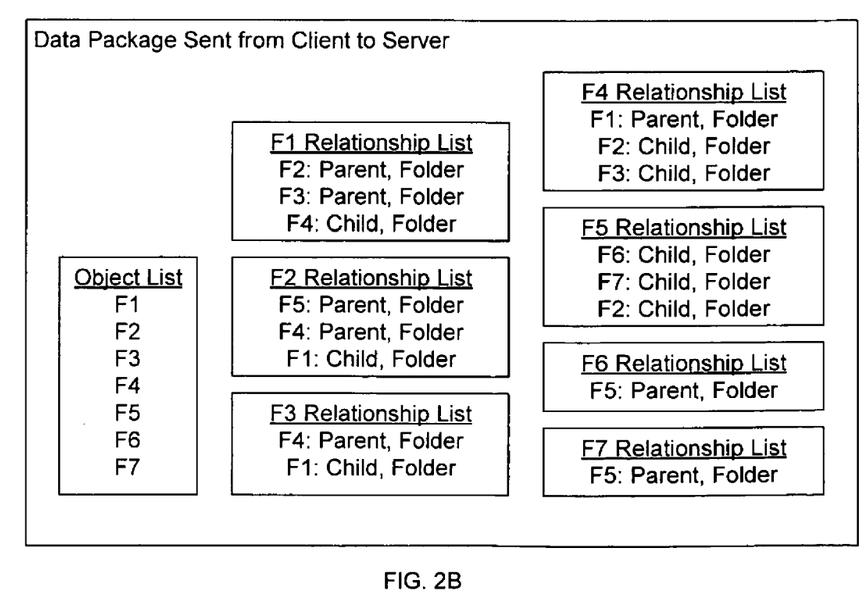
FIG. 2B is a block diagram illustrating an embodiment of a data package sent from client to server.

FIG. 2B is a block diagram illustrating an embodiment of a data package sent from client to server. In some embodiments, the data package of FIG. 2B corresponds to the directed object graph of FIG. 2A. In the example shown, the data package sent from client to server includes an object list, a F1 relationship list, a F2 relationship list, a F3 relationship list, a F4 relationship list, a F5 relationship list, a F6 relationship list, and F7 relationship list. The object list includes F1, F2, F3, F4, F5, F6, and F7. A relationship list includes an object with which there is a relationship, the relationship role, and a relationship name.

For the F1 relationship list, F1 has a relationship with F2, where F2 has the relationship role of 'parent' and the relationship name of 'folder.' F1 has a relationship with F3, where F3 has the relationship role of 'parent' and the relationship name of 'folder.' F1 has a relationship with F4, where F4 has the relationship role of 'child' and the relationship name of 'folder.'

For the F2 relationship list, F2 has a relationship with F5, where F5 has the relationship role of 'parent' and the relationship name of 'folder.' F2 has a relationship with F4, where F4 has the relationship role of 'parent' and the relationship name of 'folder.' F2 has a relationship with F1, where F1 has the relationship role of 'child' and the relationship name of 'folder.'

For the F3 relationship list, F3 has a relationship with F4, where F4 has the relationship role of 'parent' and the relationship name of 'folder.' F3 has a relationship with F1, where F1 has the relationship role of 'child' and the relationship name of 'folder.'

For the F4 relationship list, F4 has a relationship with F1, where F1 has the relationship role of 'parent' and the relationship name of 'folder.' F4 has a relationship with F2, where F2 has the relationship role of 'child and the relationship name of 'folder.' F4 has a relationship with F3, where F3 has the relationship role of 'child' and the relationship name of 'folder.'

For the F5 relationship list, F5 has a relationship with F6, where F6 has the relationship role of 'child' and the relationship name of 'folder.' F5 has a relationship with F7, where F7 has the relationship role of 'child' and the relationship name of 'folder.' F5 has a relationship with F2, where F2 has the relationship role of 'child' and the relationship name of 'folder.'

For the F6 relationship list, F6 has a relationship with F5, where F5 has the relationship role of 'parent' and the relationship name of 'folder.' For the F7 relationship list, F7 has a relationship with F5, where F5 has the relationship role of 'parent' and the relationship name of 'folder.'

Figure 3:
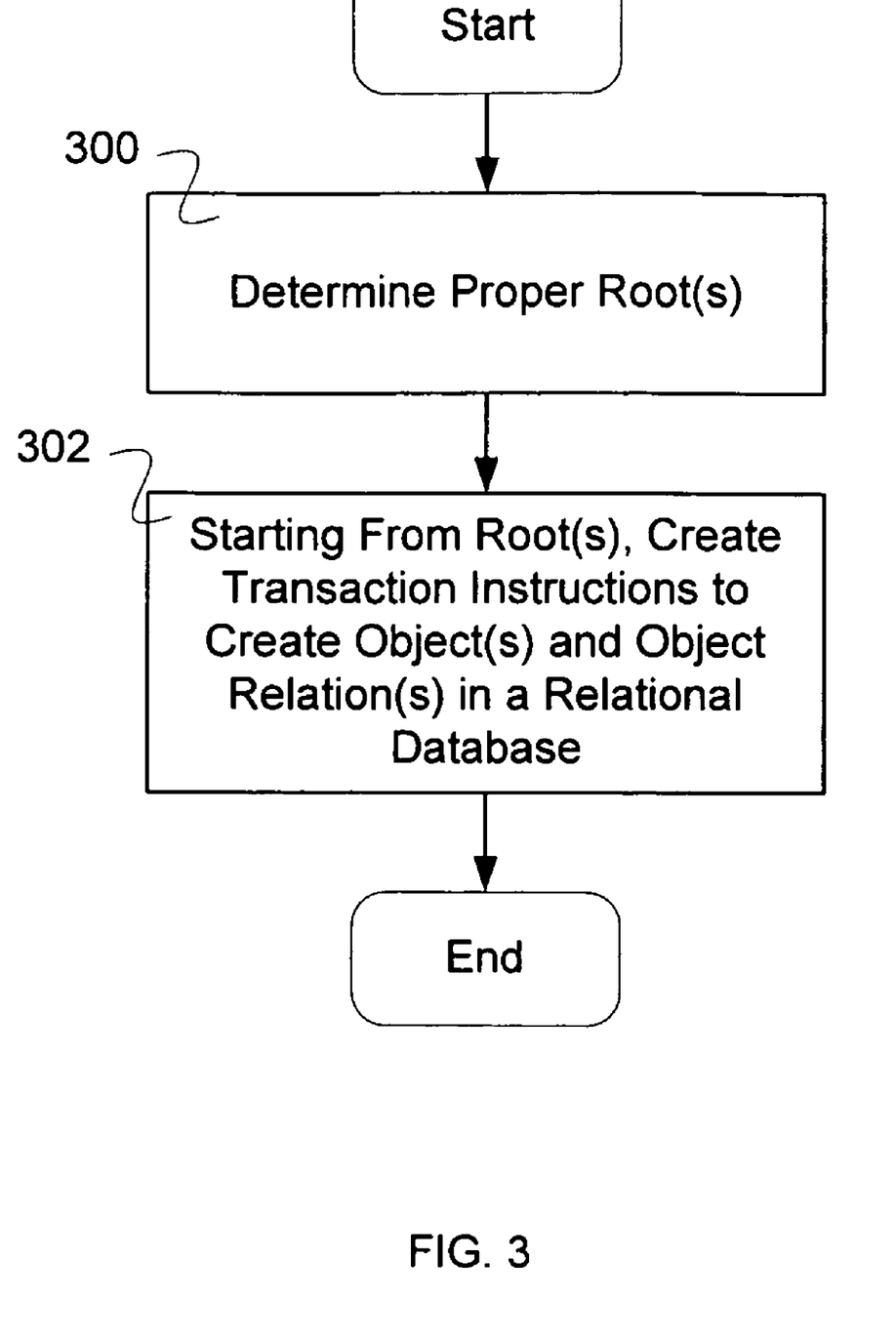
FIG. 3 is a flow diagram illustrating an embodiment of a process for processing a directed object graphs for storage in relational database.

FIG. 3 is a flow diagram illustrating an embodiment of a process for processing a directed object graphs for storage in relational database. In the example shown, in 300 proper root(s) are determined. In some embodiments, the root objects are determined for a generalized directed object graph as sent over from a client to a server. Root objects do not require another object to be created prior to the root object being created in a relational database. In 302, starting from root(s), transaction instructions are created to create object(s) and object relationship(s) in a relational database. Transaction instructions are created in an order where, when executed in association with a relational database, objects are created in an order appropriate for storage of the objects and their inter-relationships (e.g., the directed links between objects). In some embodiments, a first object creation transaction instruction is before a second object creation transaction instruction in the event that the second object requires the existence of the first object in order to create the second object and/or the second object's relationship to the first object in the relational database. In some embodiments, relationship transaction instructions are gathered regarding a given object so that the object can be updated or created with a plurality of relationships for efficiency of access time associated with accessing the object and/or number of transactional instructions.

Figure 4:
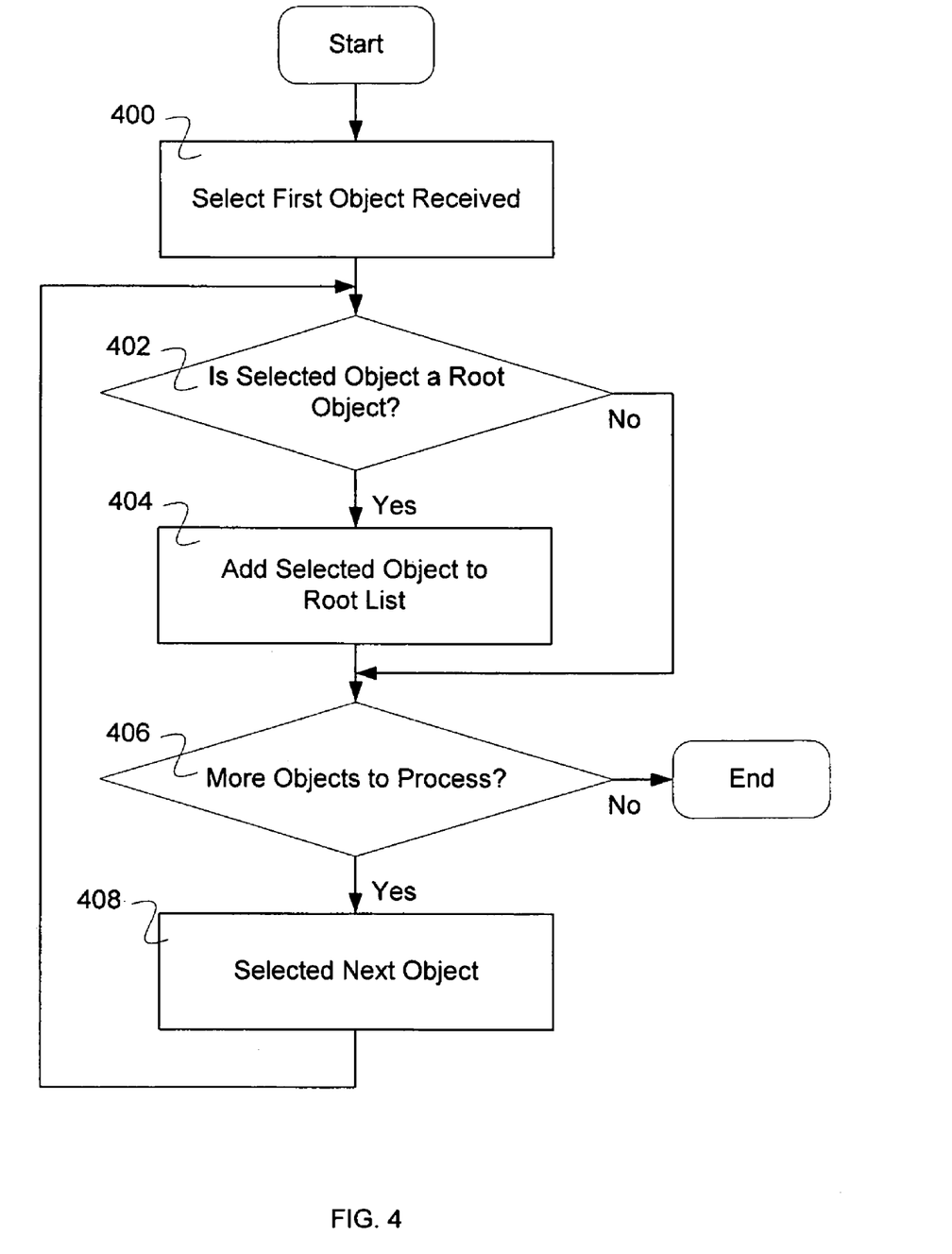
FIG. 4 is a flow diagram illustrating an embodiment of a process for determining roots.

FIG. 4 is a flow diagram illustrating an embodiment of a process for determining roots. In some embodiments, the process of FIG. 4 is used to implement 300 of FIG. 3. In the example shown, in 400 a first object received is selected. In some embodiments, the first object comprises the first object in an object list as sent from a client to a server. In 402, it is determined if the selected object is a root object. If the selected object is not a root object, then control passes to 406. If the selected object is a root object, then in 404 the selected object is added to a root list. In 406, it is determined if there are more objects to process. If there are not more objects to process in determining roots, then the process ends. If there are more objects, then in 408 a next object is selected and control passes to 402.

Figure 5:
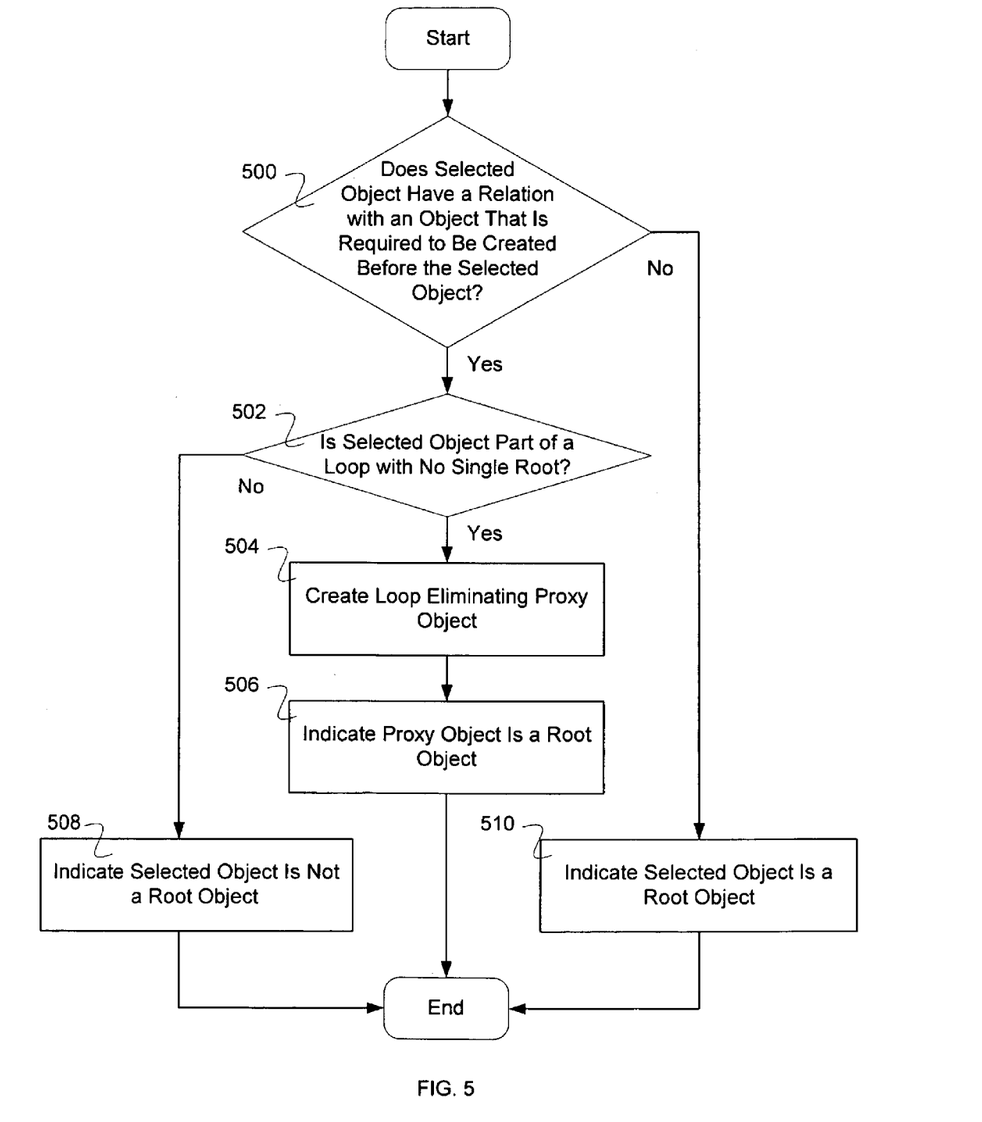
FIG. 5 is a flow diagram illustrating an embodiment of a process for determining if selected object is a root object.

FIG. 5 is a flow diagram illustrating an embodiment of a process for determining if selected object is a root object. In some embodiments, the process of FIG. 5 is used to implement 402 of FIG. 4. In the example shown, in 500 it is determined if the selected object has a relationship with an object that is required to be created before the selected object. If the selected object has no such relationships, then in 510 it is indicated that the selected object is a root object, and the process ends. If the selected object has relationships with an object that is required to be created before the selected object, then in 502 it is determined if the selected object is part of a loop with no single root. If the object is not part of a loop; then in 508 it is indicated that the selected object is not a root object, and the process ends. If the object is a part of a loop, then in 504 a loop eliminating proxy object is created. In 506, it is indicated that the proxy object is a root object, and the process ends.

Figure 6:
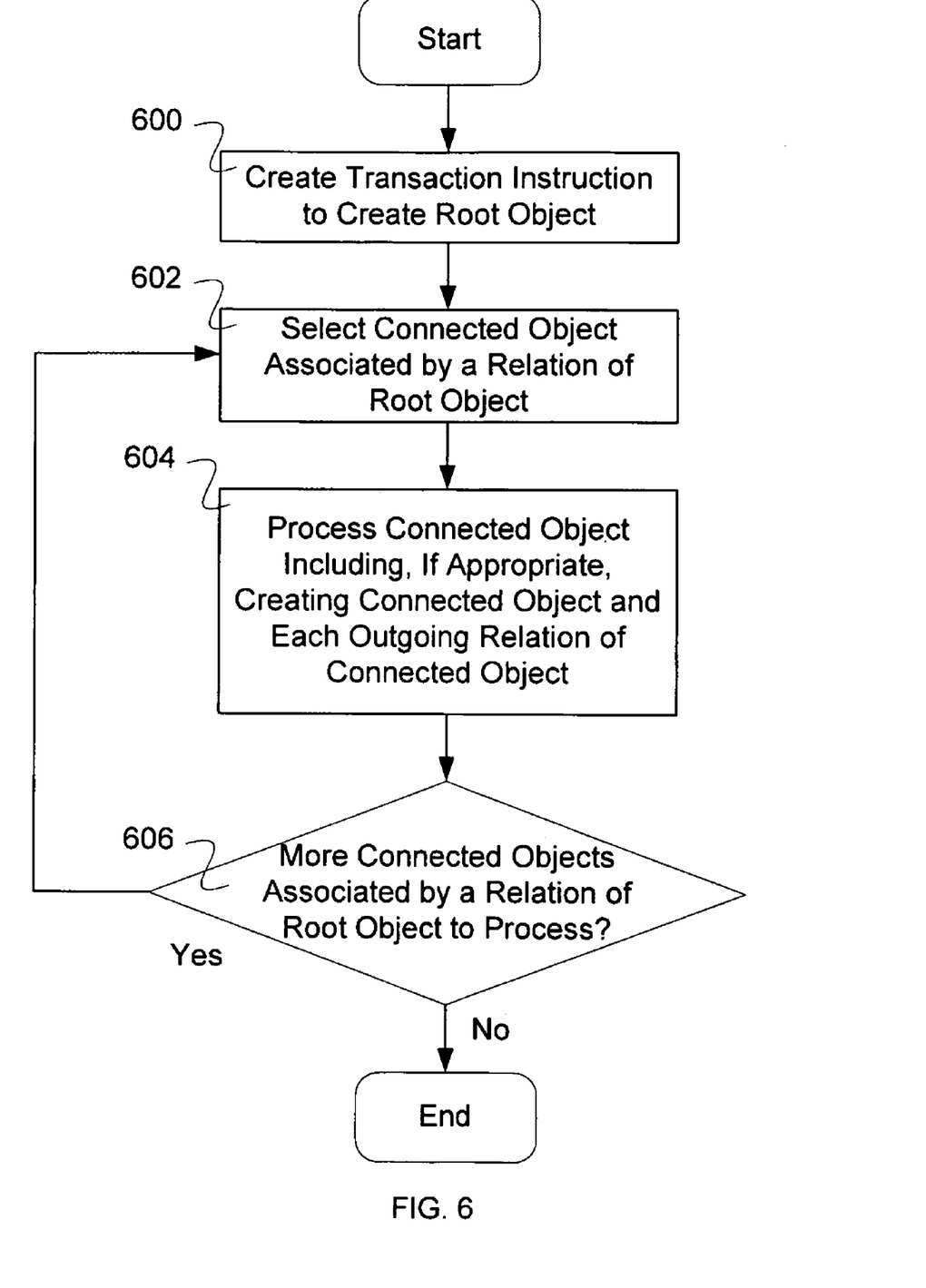
FIG. 6 is a flow diagram illustrating an embodiment of a process for creating roots and other objects.

FIG. 6 is a flow diagram illustrating an embodiment of a process for creating roots and other objects. In some embodiments, the process of FIG. 6 is used to implement 302 of FIG. 3. In the example shown, in 600 a transaction instruction is created to create a root object. In 602, a connected object associated by a relationship of the root object is selected. In 604, process connected object including, if appropriate, creating connected object and each outgoing relationship of connected object. In 606, it is determined if there are more connected objects associated by relationship of root object to process. If there are more connected objects associated by relationship of root object to process, then control is passes to 602. If there are not, then the process ends. In some embodiments, the transaction list, properly ordered because of the process used in creating the list, is stored.

Figure 7:
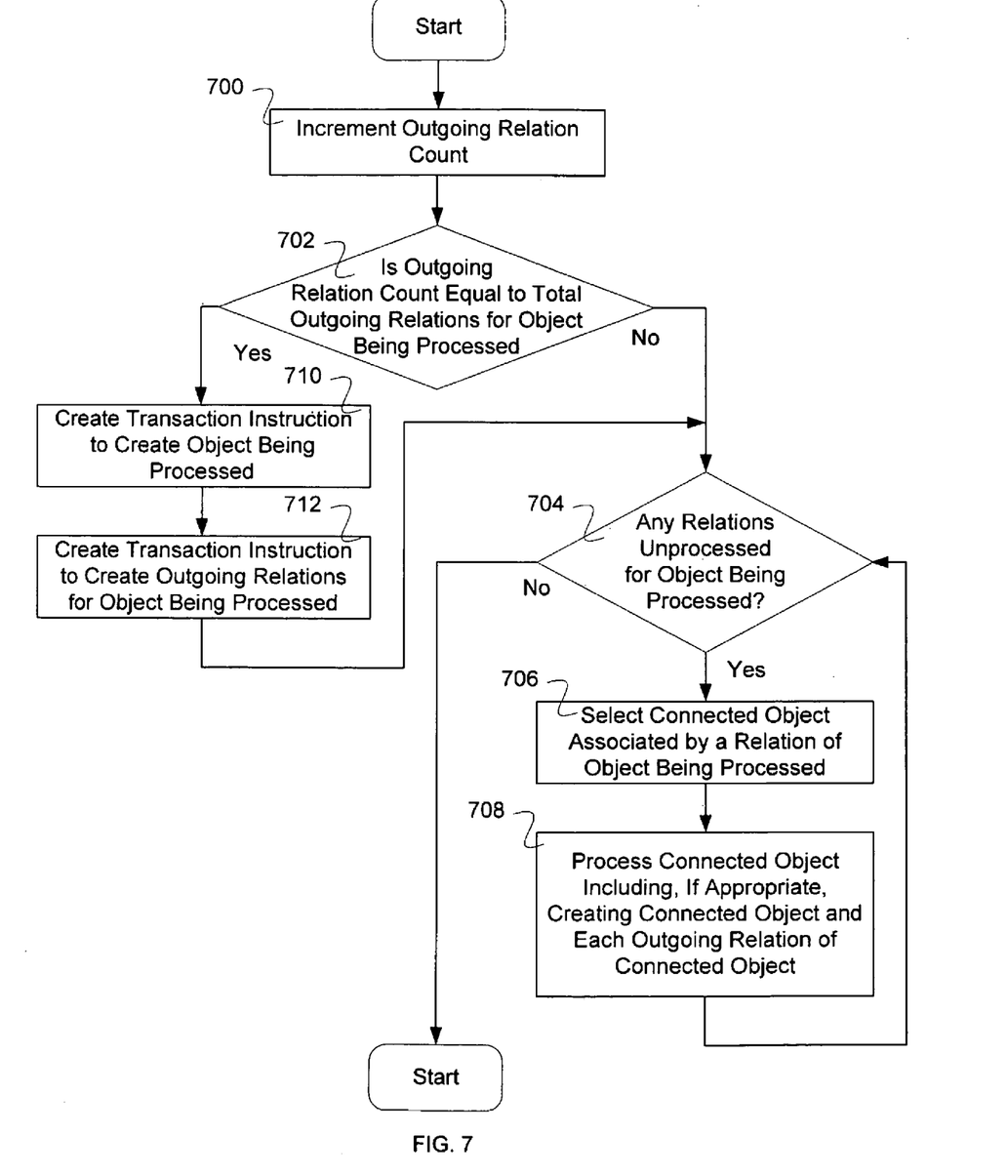
FIG. 7 is a flow diagram illustrating an embodiment of a process for processing a connected object.

FIG. 7 is a flow diagram illustrating an embodiment of a process for processing a connected object. In some embodiments, the process of FIG. 7 is used to implement 604 of FIG. 6. In the example shown, in 700 an outgoing relationship count is incremented. In 702, it is determined if the outgoing relationship count is equal to the total number of outgoing relationships for the object being processed. If it is determined that the outgoing relationship count is equal to the total number of outgoing relationships for the object being processed, then in 710 the object being processed is created. For example, a transaction is created for a relational database. In 712, outgoing relationships are created for object being processed. If it is determined that the outgoing relationship count is not equal to the total number of outgoing relationships for the object being processed, then in 704 it is determined if there are any relationships unprocessed for the object being processed. If there are not any unprocessed relationships, then the process ends. If there are unprocessed relationships, then in 706 a connected object associated by a relationship of the object being processed is selected. In 708, the connected object is processed including, if appropriate, creating connect object and each outgoing relationship of connected object, and control passes to 704. In some embodiments, the 708 is implemented using the process of FIG. 7.

Figure 8A:
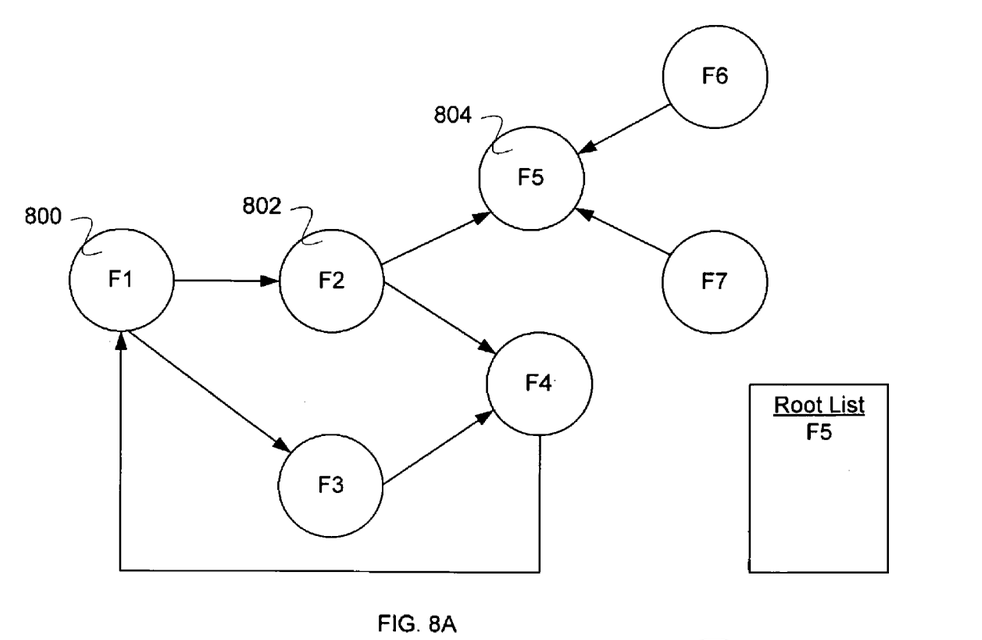
FIGS. 8A and 8B are block diagrams illustrating embodiments of a directed object graph and root list during proper root determination.
Figure 8B:
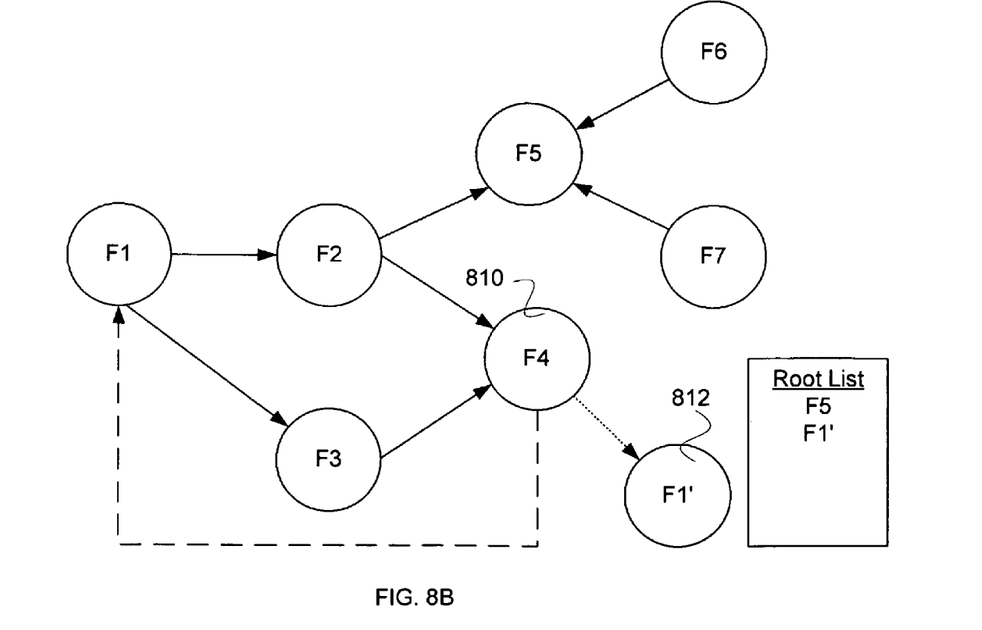

FIGS. 8A and 8B are block diagrams illustrating embodiments of a directed object graph and root list during proper root determination. In some embodiments, root determination processes of FIGS. 4 and 5 are used in determining roots for objects in a directed object graph as is being discussed in conjunction with FIGS. 8A and 8B. In the example shown in FIG. 8A, the process starts by selecting object F1 800 for processing. It is determined if object F1 800 has an object relationship with an object that must be created before object F1 800 is created (e.g., a parent relationship); Object F1 800 has parent object F2 802 and parent object F3. A next object is selected, object F2 802, and the object is evaluated. Object F2 802 has an object relationship with an object that must be created before object F2 802; Object F2 802 has parent object F5 804 and parent Object F4. A next object is selected, object F5 804, and the object is evaluated. Object F5 804 does not have an object relationship with an object that must be created before object F5 804; Object F5 804 has only child relationships with objects—in this case, object F6, F7, and F2. Object F5 804 is therefore added to a root list.

In the example shown in FIG. 8B, a next object is selected, object F4 810, and the object is evaluated. Object F4 810 has an object relationship with an object that must be created before object F4 810; Object F4 810 has parent object F1. However, F1 has been previously evaluated indicating that there is a loop in the directed object graph. The loop is addressed by creating a proxy object F1' 812 and indicating that object F1' 812 has a parent relationship with object F4 810. Object F1' 812 is added to the root list.

In the example shown in FIG. 8B, a next object is selected, object F3, and the object is evaluated. Object F3 has an object relationship with an object that must be created before object F3; Object F3 has parent object F4 810. All objects have been evaluated, so the process for determining proper roots ends.

Figure 9A:
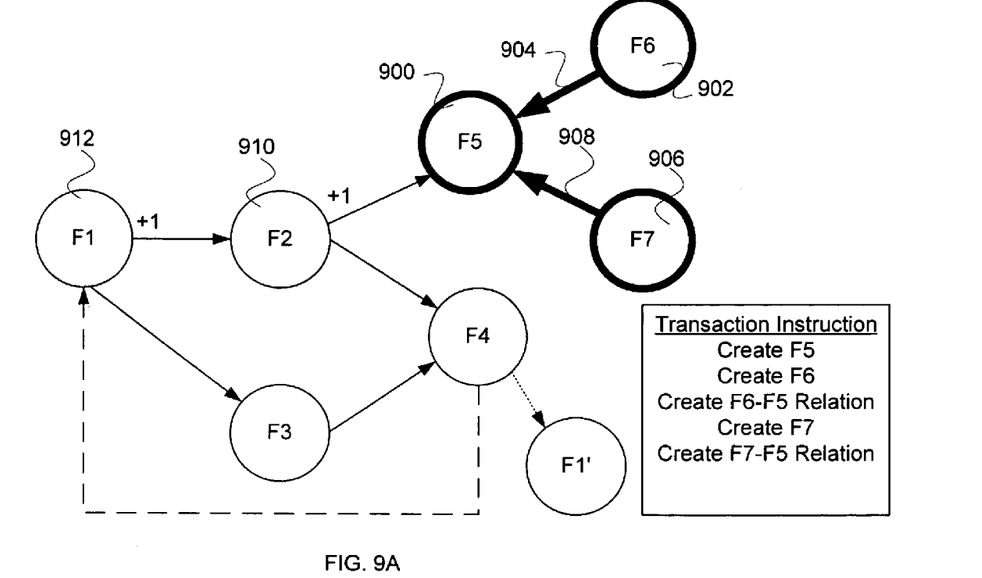
FIGS. 9A, 9B, and 9C are block diagrams illustrating embodiments of a directed object graph during processing of creating transaction instructions for a relational database regarding the directed object graph.
Figure 9B:
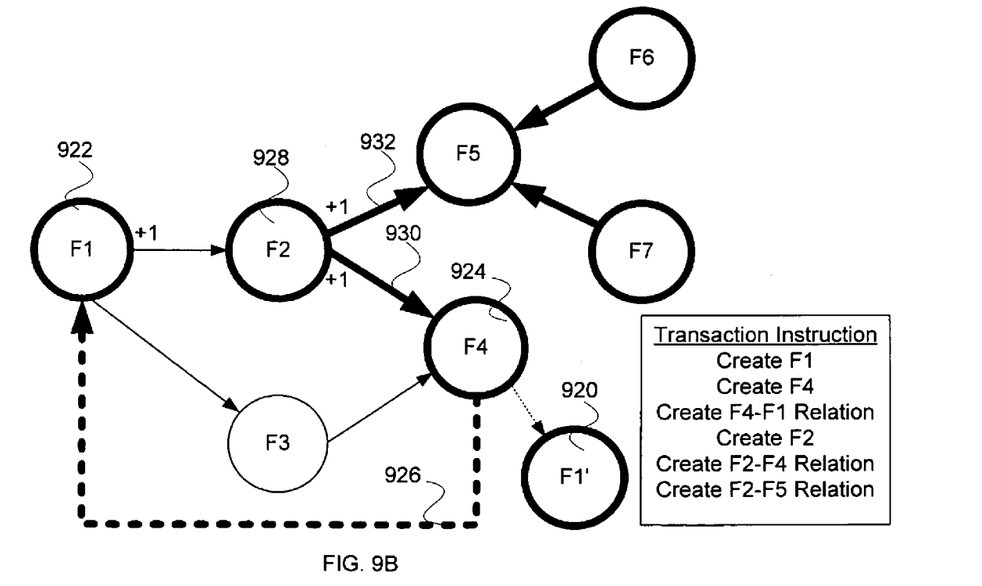
Figure 9C:
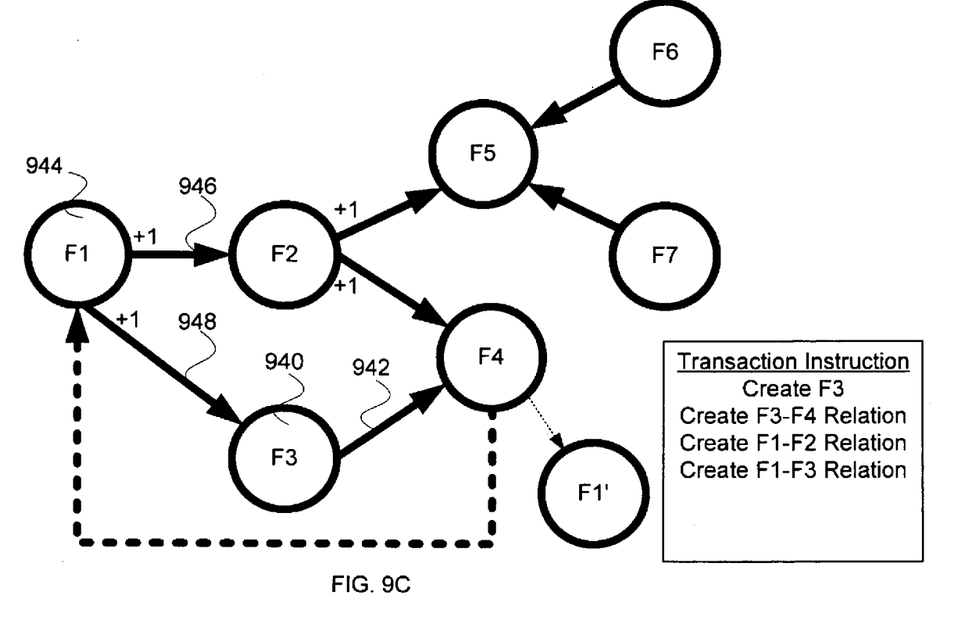

FIGS. 9A, 9B, and 9C are block diagrams illustrating embodiments of a directed object graph during processing of creating transaction instructions for a relational database regarding the directed object graph. In some embodiments, transaction creation processes of FIGS. 6 and 7 are used in creating transaction instructions for objects in a directed object graph as is being discussed in conjunction with FIGS. 9A, 9B, and 9C. In the example shown in FIG. 9A, the process starts by selecting object F5 900, the first entry in the root list, for processing. A transaction instruction is created to create root object F5 900. Object F5 900 has a child relationship 904 with object F6 902. Object F6 902 has no other outgoing or parent-type relationships (e.g., ones requiring another object to be created before it is created). A transaction instruction is created to create object F6 902, and a transaction instruction is created to create relationship 904 between object F6 902 and object F5 900. Object F5 900 has a child relationship 908 with object F7 906. Object F7 906 has no other outgoing or parent-type relationships (e.g., ones requiring another object to be created before it is created). A transaction instruction is created to create object F7 906, and a transaction instruction is created to create relationship 908 between object F5 906 and object F5 900.

In the example shown in FIG. 9A, object F5 900 has a child relationship with object F2 910. Object F2 has two outgoing relationships: one to object F5 900 and one to object F4. So, object F2 cannot yet be created. A '+1' is indicated associated with object F2 910. Object F2 has a child relationship with object F1 912. Object F1 has two outgoing relationships: one to object F2 910 and one to object F3. So, object F1 cannot yet be created. A '+1' is indicated associated with object F1 912.

In the example shown in FIG. 9B, the process starts by selecting object F1' 920, a next entry in the root list, for processing. In some embodiments, the root list entry was added in a process such as is discussed in association with FIG. 8B. A transaction instruction is created to create root object F1 922, which corresponds to object F1' 920. Object F1' 920 has a child relationship with object F4 924. Object F4 924 has no other outgoing or parent-type relationships (e.g., ones requiring another object to be created before it is created). A transaction instruction is created to create object F4 924, and a transaction instruction is created to create relationship 926 between object F4 924 and object F1 922, which corresponds to object F1' 920. Object F4 924 has two child relationships: one with object F2 928 and one with object F3. Object F2 928 has two outgoing relationships: one with object F5 and one with object F4 924. A '+1' is indicated associated with object F2 928. Both outgoing relationships for F2 928 are now accounted for. A transaction instruction is created to create object F2 928, a transaction instruction is created to create relationship 930 between object F2 928 and object F4 924, and a transaction instruction is created to create relationship 932 between object F2 928 and F5. Object F1 922 and the relationship with object F2 928 has already been processed. In some embodiments, the transaction instructions for creating an object and associated relationship(s) with the object are combined. For example, a transaction instruction is created to create object F2 928 and also create relationship 930 and 932.

In the example shown in FIG. 9C, object F4 has a child relationship with object F3 940. Object F3 940 has only one outgoing relationship, relationship 942. A transaction instruction is created to create object F3 940, and a transaction instruction is created to create relationship 942 between object F3 940 and object F4. Object F3 940 has one child relationship with object F1 944. Object F1 944 has two outgoing relationships: one with object F2 and one with object F3 940. A '+1' is indicated associated with object F3 940. Both outgoing relationships for F1 944 are now accounted for. Object F1 944 is already created, so it does not require an additional transaction instruction to be created. A transaction instruction is created to create relationship 946 between object F1 944 and object F2, and a transaction instruction is created to create relationship 948 between object F1 944 and object F3 940. In some embodiments, the transaction instructions for creating multiple relationships associated with a given object are combined. For example, a transaction instruction is created to create relationship 946 and 948 where the relationships are created with a combined instruction. This is essentially a transaction that processes all 'relations-to-parents' instruction and enables a significant performance benefit.

In some embodiments, a relationship is associated with an object, and a relationship is created using an update function to the object. For example, a relationship directed from a first object to a second object is created by updating the first object. In some embodiments, a delete function is provided enabling deletion of a relationship associated with an object.

In some embodiments, the transaction instructions for creating multiple relationships associated with a given object are combined. For example, a transaction instruction is created to create relationship 946 and 948. In various embodiments, transactions creating all relationships for an object or for multiple objects are combined enabling a significant performance benefits. In some embodiments, the transaction instructions for creating multiple objects are combined.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for creating transaction instructions, comprising:
   an interface for receiving a description of a set of objects at a server and for receiving for each of at least a subset of objects in the set of objects a description of one or more associated relationships; and
   a processor for processing the description of the set of objects and the descriptions of the one or more associated relationships for each object in the at least a subset of objects in the set of objects to create an ordered list of transaction instructions for storing the set of objects and the one or more associated relationships for each object in the at least a subset of objects in the set of objects, wherein transaction instructions for storing multiple relationships associated with a given object are combined into a single transaction instruction to efficiently create the multiple relationships or update the given object; and
   a memory coupled to the processor and configured to provide the processor with instructions.

2. The system as in claim 1, wherein the processor is further configured to create instructions to combine object creation and relationship creation.

3. The system as in claim 1, wherein receiving is from a client.

4. The system as in claim 1, further comprising a storage device for storing the set of objects and the one or more associated relationships for each object in the at least a subset of objects in the set of objects using the list of transaction instructions in a relational database.

5. The system as in claim 1, wherein processing the description of the set of objects and the descriptions of the one or more associated relationships for each object in the at least a subset of objects in the set of objects comprises determining whether a first transaction for storing one of the one or more relationships associated with each object in the at least a subset of objects in the set of objects is combined with a second transaction for storing one of the one or more relationships associated with each object in the at least a subset of objects in the set of objects.

6. The system as in claim 1, wherein processing the description of the set of objects and the descriptions of the one or more associated relationships for each object in the at least a subset of objects in the set of objects comprises determining whether a first transaction for storing one of the objects of the set of objects is combined with a second transaction for storing one of the one or more relationships associated with each object in the at least a subset of objects in the set of objects.

7. The system as in claim 1, wherein the description of the set of objects comprises a complete listing of objects.

8. The system as in claim 1, wherein the description of the set of objects comprises a partial listing of objects.

9. The system as in claim 1, wherein the description of the set of objects includes a reference to an already stored object.

10. The system as in claim 1, wherein the description of the set of objects comprises a list of objects in an arbitrary order.

11. The system as in claim 1, wherein the description of the one or more associated relationships comprises a complete listing of associated relationships.

12. The system as in claim 1, wherein the description of the one or more associated relationships comprises a partial listing of associated relationships.

13. The system as in claim 1, wherein the description of the one or more associated relationships comprises a list of associated relationships in an arbitrary order.

14. A method for creating transaction instructions, comprising:
   receiving a description of a set of objects at a server;
   receiving for each of at least a subset of objects in the set of objects a description of one or more associated relationships; and
   processing the description of the set of objects and the descriptions of the one or more associated relationships for each object in the at least a subset of objects in the set of objects to create an ordered list of transaction instructions for storing the set of objects and the one or more associated relationships for each object in the at least a subset of objects in the set of objects, wherein transaction instructions for storing multiple relationships associated with a given object are combined into a single transaction instruction to efficiently create the multiple relationships or update the given object.

15. A computer program product for creating transaction instructions, the computer program product being embodied in a computer readable storage medium and comprising computer instructions for:
   receiving a description of a set of objects at a server;
   receiving for each of at least a subset of objects in the set of objects a description of one or more associated relationships; and
   processing the description of the set of objects and the descriptions of the one or more associated relationships for each object in the at least a subset of objects in the set of objects to create an ordered list of transaction instructions for storing the set of objects and the one or more associated relationships for each object in the at least a subset of objects in the set of objects, wherein transaction instructions for storing multiple relationships associated with a given object are combined into a single transaction instruction to efficiently create the multiple relationships or update the given object.

* * * * *